United States Patent
Banno et al.

(10) Patent No.: US 11,154,921 B2
(45) Date of Patent: Oct. 26, 2021

(54) MANUFACTURING DEVICE FOR LAMINATED IRON CORE

(71) Applicant: TOYOTA BOSHOKU KABUSHIKI KAISHA, Aichi-ken (JP)

(72) Inventors: Hajime Banno, Tokai (JP); Shinpei Ono, Yokkaichi (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 183 days.

(21) Appl. No.: 16/166,987

(22) Filed: Oct. 22, 2018

(65) Prior Publication Data

US 2019/0126339 A1    May 2, 2019

(30) Foreign Application Priority Data

Oct. 27, 2017 (JP) .............................. JP2017-208480

(51) Int. Cl.
*B21D 28/14* (2006.01)
*H02K 15/02* (2006.01)
(Continued)

(52) U.S. Cl.
CPC .............. *B21D 28/14* (2013.01); *B21D 22/26* (2013.01); *B21D 22/30* (2013.01); *B21D 28/145* (2013.01);
(Continued)

(58) Field of Classification Search
CPC ........ B21D 28/14; B21D 22/26; B21D 22/30; B21D 28/145; B21D 28/34; B21D 43/003; B21D 45/00; B21D 45/003; H02K 15/02
(Continued)

(56) References Cited

U.S. PATENT DOCUMENTS

| 6,877,422 B2 * | 4/2005 | Hisanobu ................ B30B 1/261 100/257 |
| 2003/0200878 A1 | 10/2003 | Hisanobu et al. |
| 2017/0072448 A1 * | 3/2017 | Horii ...................... B21D 22/20 |

FOREIGN PATENT DOCUMENTS

| JP | 2003-311486 | 11/2003 |
| JP | 2006-35267 | 2/2006 |

(Continued)

OTHER PUBLICATIONS

Translation of JP-2006035267-A (Year: 2006).*
(Continued)

*Primary Examiner* — Adam J Eiseman
*Assistant Examiner* — Teresa A Guthrie
(74) *Attorney, Agent, or Firm* — Greenblum & Bernstein, P.L.C.

(57) ABSTRACT

A device for manufacturing a laminated iron core includes a die and a punch configured to punch iron core pieces out of a thin-plate workpiece, a squeeze ring in which the iron core pieces are laminated, and a back-pressure device configured to apply back pressure to the laminated iron core pieces from a side opposite to the punch in a forward-backward direction of the punch. The back-pressure device includes a support body configured to move in the forward-backward direction, a biasing member configured to bias the laminated iron core pieces toward the punch, a drive device having an output shaft, and a conversion mechanism configured to convert rotary motion of the output shaft into linear motion of the support body in the forward-backward direction.

12 Claims, 4 Drawing Sheets

(51) Int. Cl.
  *B21D 22/26* (2006.01)
  *B21D 22/30* (2006.01)
  *B21D 28/34* (2006.01)
  *B21D 43/00* (2006.01)

(52) U.S. Cl.
  CPC ............ *H02K 15/02* (2013.01); *B21D 28/34* (2013.01); *B21D 43/003* (2013.01)

(58) Field of Classification Search
  USPC .................. 72/333, 429, 430, 431, 435, 441
  See application file for complete search history.

(56) References Cited

FOREIGN PATENT DOCUMENTS

| | | | |
|---|---|---|---|
| JP | 2006026735 A | * | 2/2006 |
| JP | 2006035267 A | * | 2/2006 |
| JP | 2011-73047 | | 4/2011 |
| JP | 5859715 | | 2/2016 |

OTHER PUBLICATIONS

Translation of JP-2006026735-A (Year: 2006).*
Chinese Office Action for Chinese Patent Application No. 201811237979.9 dated Dec. 26, 2019, along with English translation.
Japan Office Action issued in Japan Patent Application No. 2017-208480, dated May 25, 2021, together with English translation thereof.

* cited by examiner

MANUFACTURING DEVICE FOR LAMINATED IRON CORE

BACKGROUND

The present invention relates to a manufacturing device for a laminated iron core.

A rotating electric motor core of a magnet-insertion type is manufactured by laminating thin magnetic steel plates, each including a recess and a projection, and by fitting and swaging the recess and the projection of the magnetic steel plates adjacent to each other. The manufacturing device for such a motor core (hereinafter referred to as laminated iron core) includes a back-pressure device. The back-pressure device, at the same time when punching an iron core piece out of the magnetic steel plate using a die and a punch, applies back pressure to the iron core pieces held in a squeeze ring from the side opposite to the punch (refer to, for example, Japanese Patent No. 5859715).

The back-pressure device described in the document includes a receiving base on which the iron core pieces are placed, a ball screw that supports the receiving base, and a lifting-lowering motor that rotates the ball screw. The receiving base is provided in the squeeze ring to be vertically movable. The squeeze ring holds the punched iron core pieces. When punching the magnetic steel plates, the device increases the output torque of the lifting-lowering motor, thereby increasing the back pressure produced by the receiving base. Thus, when iron core pieces are laminated and swaged, suitable back pressure is applied to each iron core piece.

In the above-described back-pressure device, the ball screw that lifts and lowers the receiving base extends along the forward-backward direction (vertical direction) of the punch. This limits size reduction of the back-pressure device in the forward-backward direction. Thus, it is difficult to reduce the size of the entire manufacturing device.

SUMMARY OF THE INVENTION

It is an object of the present invention to provide a manufacturing device for a laminated iron core that can be reduced in size.

A manufacturing device for a laminated iron core that achieves the above-described object includes a die and a punch configured to punch iron core pieces out of a thin-plate workpiece, a squeeze ring in which the iron core pieces are laminated, and a back-pressure device configured to apply back pressure to the laminated iron core pieces from a side opposite to the punch in a forward-backward direction of the punch. The laminated iron core pieces are swaged using the punch and the back-pressure device, thereby manufacturing the laminated iron core. The back-pressure device includes a support body configured to move in the forward-backward direction of the punch, a biasing member supported by the support body and configured to bias the laminated iron core pieces toward the punch, a drive device comprising an output shaft rotated about an orthogonal direction that is orthogonal to the forward-backward direction, and a conversion mechanism configured to convert rotary motion of the output shaft into linear motion of the support body in the forward-backward direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferable embodiments together with the accompanying drawings in which.

DETAILED DESCRIPTION

A manufacturing device for a laminated iron core according to one embodiment (hereinafter simply referred to as manufacturing device 1) will now be described with reference to FIGS. 1 to 5.

Figure 1:
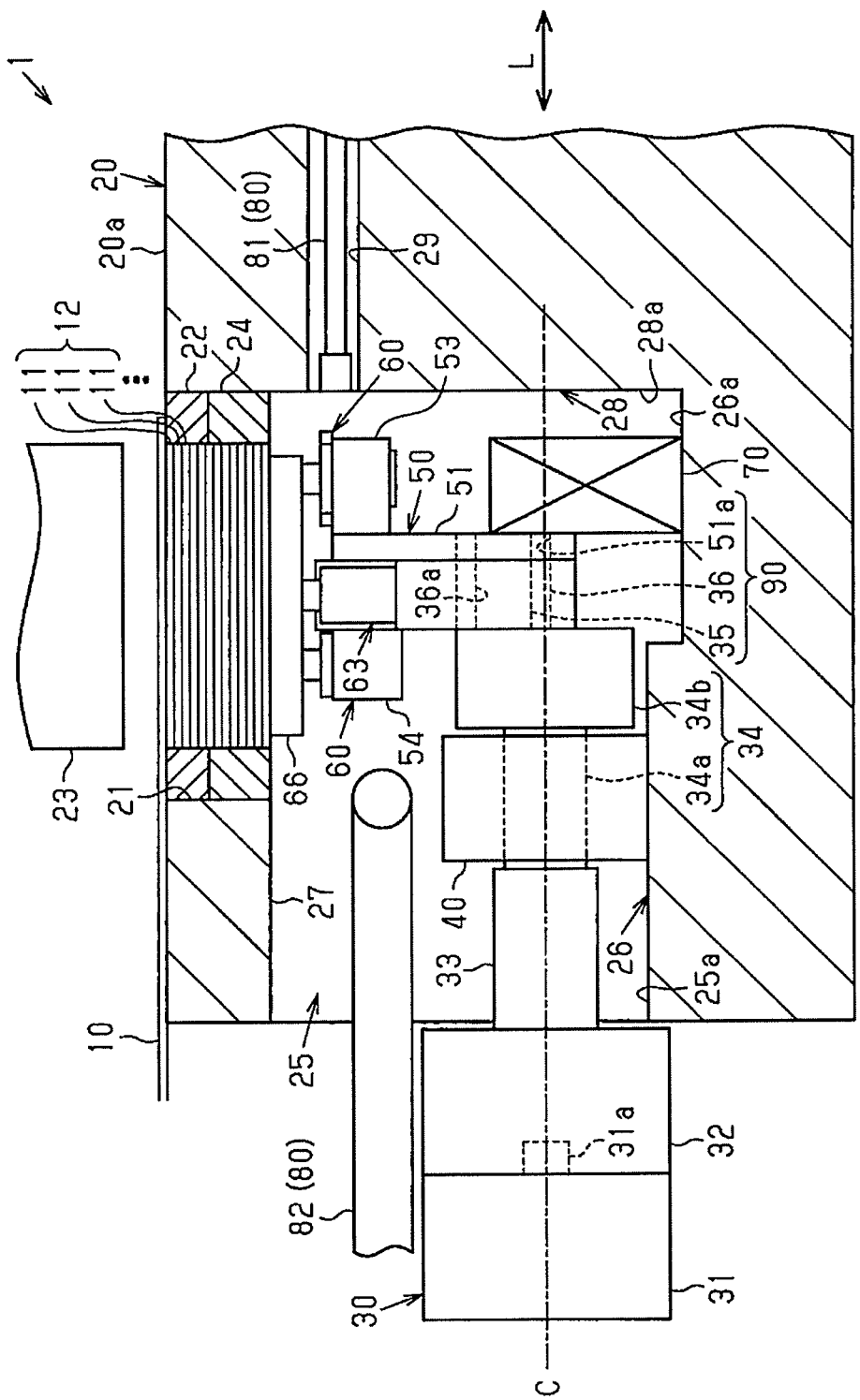
FIG. 1 is a cross-sectional view showing the structure of a manufacturing device for a laminated iron core according to an embodiment.

Referring to FIG. 1, the manufacturing device 1 includes a lower die assembly 20 and an upper die assembly (not shown). The lower die assembly 20 is provided with a die 22, which is substantially tubular. The upper die assembly is arranged above the lower die assembly 20 and provided with a punch 23. The punch 23, which is substantially cylindrical, is movable toward and away from the die 22.

The lower die assembly 20 has a through hole 21 opening in a supporting surface 20a, which is the upper surface of the lower die assembly 20. The through hole 21 is in communication with an accommodation space 25 located in the lower die assembly 20. The die 22 is fitted and fixed to the inside of the through hole 21.

A squeeze ring 24 having a slightly smaller inner diameter than that of the die 22 is provided immediately below the die 22 in the through hole 21.

In such a manufacturing device 1, when a thin workpiece 10 made of a magnetic steel plate is conveyed to the upper side of the die 22, the punch 23 is lowered toward the die 22 so that disk-shaped iron core piece 11 is punched out of the workpiece 10. The punched iron core piece 11 is pushed into the squeeze ring 24 and supported by the squeeze ring 24 from the side over the entire circumference.

The accommodation space 25 includes an opening 25a that opens in the side surface of the lower die assembly 20 (left side surface in FIG. 1).

The accommodation space 25 is defined by a bottom surface 26, a ceiling surface 27, and an inner surface 28, which are continuous with the opening 25a.

The inner surface 28 includes an opposed portion 28a opposed to the opening 25a.

The part of the bottom surface 26 adjacent to the opposed portion 28a of the inner surface 28 is provided with a step 26a. The step 26a is lower than the part of the bottom surface 26 in the vicinity of the opening 25a.

The manufacturing device 1 includes a back-pressure device 30 that applies back pressure to the iron core pieces 11 in the squeeze ring 24 from below, i.e., from the side opposite to the punch 23 in the forward-backward direction of the punch 23.

The back-pressure device 30 of the present embodiment will now be described in detail.

The back-pressure device 30 includes a servomotor 31 serving as a drive device, a reduction drive 32 coupled to an output shaft 31a of the servomotor 31, a joint 33 coupled to an output shaft of the reduction drive 32, and a shaft 34 coupled to the joint 33. The output shaft 31a of the servomotor 31, the output shaft of the reduction drive 32, the joint 33, and the shaft 34 are located on the same axis C.

The shaft 34 includes a cylindrical coupled portion 34a coupled to the joint 33 and a cylindrical increased-diameter portion 34b continuous with the opposite side of the coupled portion 34a from the joint 33. The increased-diameter portion 34b has a larger outer diameter than the coupled portion 34a.

The coupled portion 34a of the shaft 34 is rotationally supported by a bearing 40 arranged in the accommodation space 25.

In the present embodiment, the joint 33 and the shaft 34 are accommodated in the accommodation space 25. Further, the increased-diameter portion 34b of the shaft 34 includes a distal surface opposed to the opposed portion 28a of the inner surface 28 of the accommodation space 25.

In the following description, the direction (sideward direction in FIG. 2) along the axis C of the output shaft 31a of the servomotor 31 is referred to as an axial direction L, and the direction (vertical direction in FIG. 2) orthogonal to the axial direction L and the vertical direction is referred to as a width direction W. Further, in the following description, the side toward the distal end of the shaft 34 in the axial direction L is simply referred to as a distal side, and the side toward the basal end of the shaft 34 in the axial direction L is simply referred to as a basal side.

Figure 3:
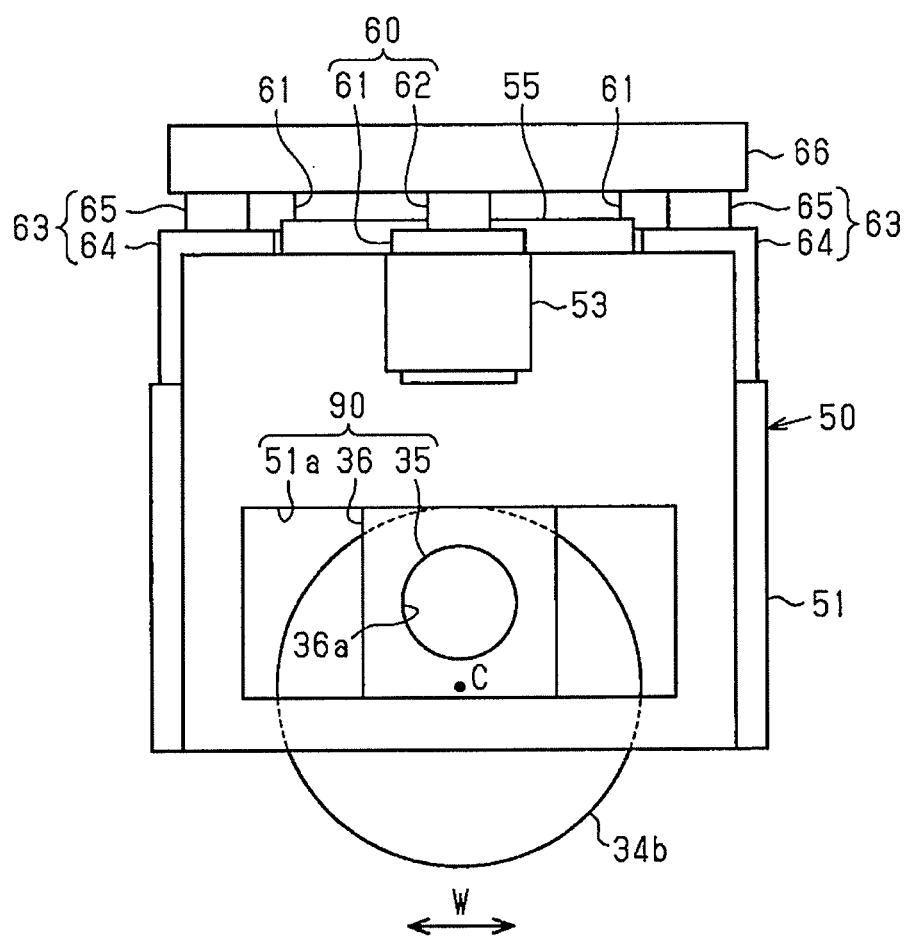
FIG. 3 is a front view showing the back-pressure device as viewed from the right side in FIG. 2.

As shown in FIGS. 1 and 3, an eccentric rod 35 eccentric to the axis C protrudes from the distal end of the increased-diameter portion 34b of the shaft 34. The eccentric rod 35 extends along the axial direction L.

Figure 2:
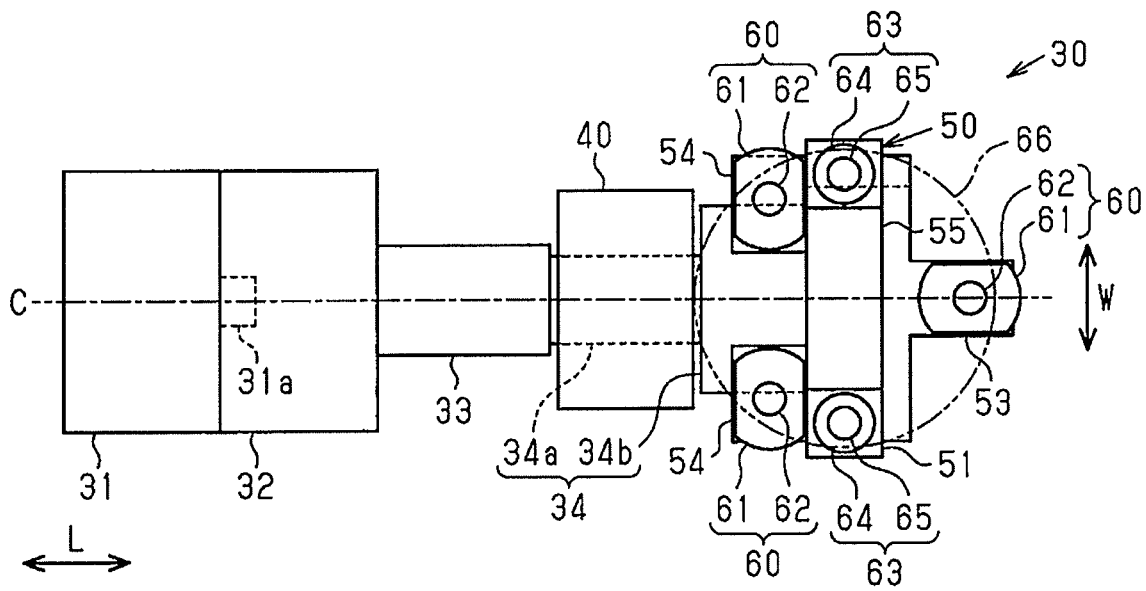
FIG. 2 is a plan view showing a back-pressure device of the embodiment.

As shown in FIGS. 1 to 3, a support body 50 is coupled to the distal part of the shaft 34. The support body 50 is located below the squeeze ring 24. The support body 50 includes a base 51 that extends in the width direction W and is substantially cuboid. The base 51 is provided with an accommodation portion 51a extending through the base 51 along the axial direction L and extending along the width direction W.

As shown in FIG. 3, the accommodation portion 51a is rectangular in the front view and defines a cuboid space. The accommodation portion 51a accommodates a transmission member 36, which is substantially cuboid. The height of the transmission member 36 (length in vertical direction) is slightly lower than that of the accommodation portion 51a. In addition, the width of the transmission member 36 (length in width direction W) is lower than half the width of the accommodation portion 51a. Thus, in the accommodation portion 51a, relative movement of the transmission member 36 is restricted in the vertical direction, and relative movement of the transmission member 36 is permitted in the width direction W. The middle part of the transmission member 36 in the vertical direction and the width direction W has a support hole 36a extending through the transmission member 36 along the axial direction L. The eccentric rod 35 of the shaft 34 is inserted into the support hole 36a. That is, the support hole 36a rotationally supports the shaft 34.

Rotation of the output shaft 31a of the servomotor 31 rotates the shaft 34. The rotation of the shaft 34 rotates the eccentric rod 35 along a predetermined circular orbit about the axis C and causes the transmission member 36 to rotate. The transmission member 36 is accommodated in the accommodation portion 51a in the manner as described above. Thus, force that causes the transmission member 36 to rotate, i.e., force that causes the transmission member 36 to move in the vertical direction and the width direction W is transmitted to the support body 50 so that the support body 50 moves in the vertical direction.

As shown in FIG. 1, the step 26a of the bottom surface 26 of the accommodation space 25 is provided with a known guide mechanism 70. The guide mechanism 70 engages an engaged portion (not shown) provided on the distal surface of the base 51 of the support body 50 to guide movement of the support body 50 along the vertical direction.

In the present embodiment, the eccentric rod 35 of the shaft 34, the transmission member 36, and the accommodation portion 51a of the support body 50 constitute a conversion mechanism 90. The conversion mechanism 90 converts rotary motion of the shaft 34 (output shaft 31a of servomotor 31) into up-down movement of the support body 50, i.e., linear motion in the vertical direction.

As shown in FIG. 2, the upper part of the base 51 is provided with a first projection 53 projecting from the middle part in the width direction W toward the distal side (right side in FIG. 2) and two second projections 54 projecting from the opposite ends in the width direction W toward the basal side (left side in FIG. 2).

As shown in FIG. 2, three bushings 61 are concentrically fixed to the upper parts of the first projection 53 and the second projections 54. Each bushing 61 includes a center hole (not shown) extending along the vertical direction. The lower part of a post 62 is inserted into the center hole of each bushing 61. The bushing 61 supports the post 62 so that the post 62 can be lifted and lowered. A circular receiving base 66 is fixed to the upper end of each post 62. The receiving base 66 receives a laminated body 12 constituted by a plurality of laminated iron core pieces 11. Each bushing 61 and each post 62 constitute a guide member 60 that guides movement of the receiving base 66 relative to the support body 50 in the vertical direction.

As shown in FIGS. 2 and 3, the middle part of the base 51 in the width direction W is provided with a restriction protrusion 55 that protrudes upward.

The opposite ends of the upper end of the base 51 in the width direction W are provided with two gas springs 63 serving as biasing members. Each gas spring 63 includes a cylinder 64 fixed to the base 51 and filled with gas and a rod 65 that is accommodated in the cylinder 64 and can be lifted and lowered relative to the cylinder 64. The rod 65 protrudes upward from the cylinder 64.

Reaction force produced by each gas spring 63 is substantially fixed in a movable range of the rod 65.

The upper end of each rod 65 is fixed to the lower surface of the circular receiving base 66.

The upper surface of the restriction protrusion 55 is located at the uppermost side of the support body 50. Thus, when the receiving base 66 moves toward the support body 50 against biasing force of the gas springs 63, the lower surface of the receiving base 66 abuts the upper surface of the restriction protrusion 55. This restricts movement of the receiving base 66.

Figure 5:
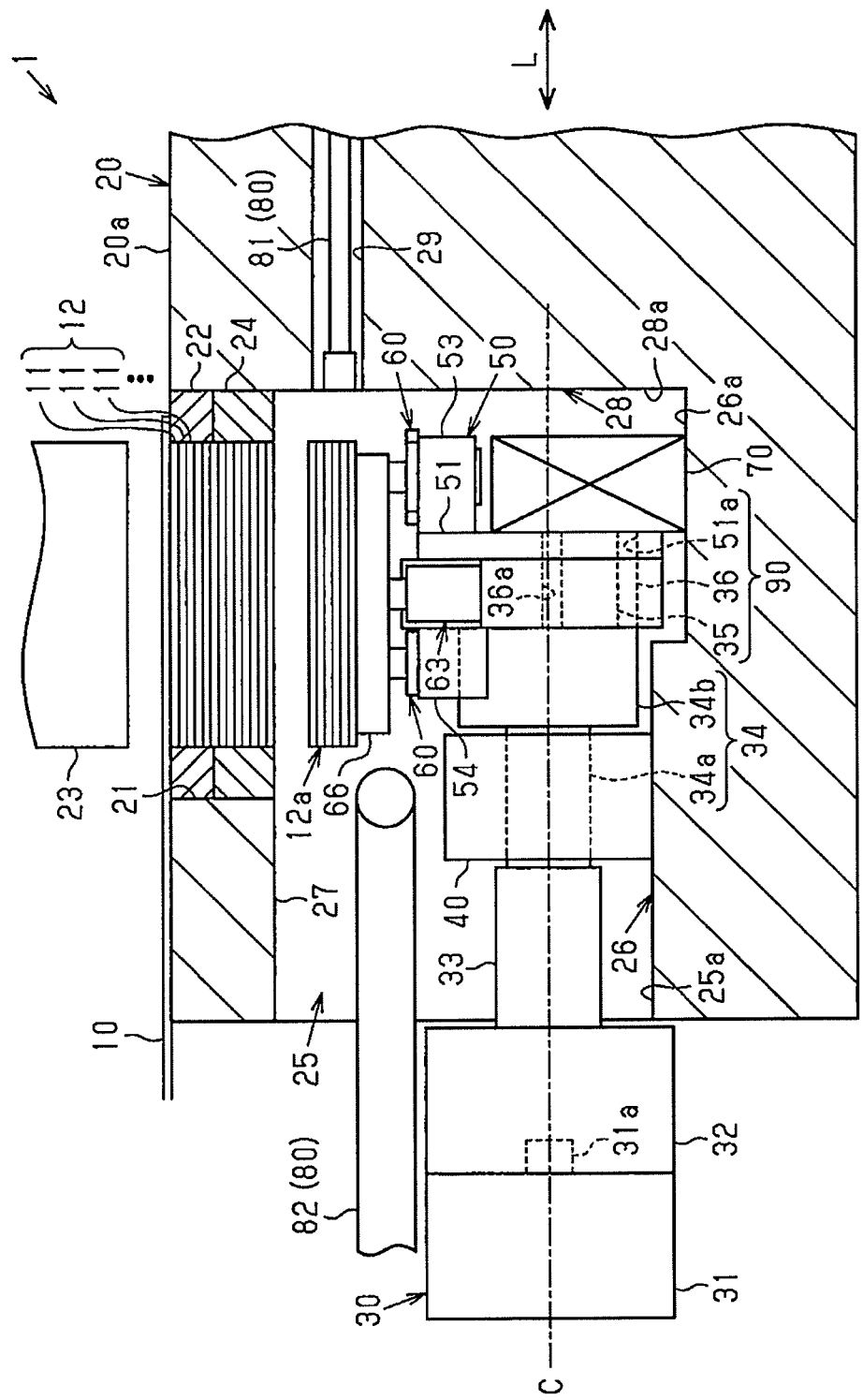
FIG. 5 is a cross-sectional view corresponding to FIG. 1 and illustrating the support body of the back-pressure device located at the lowest position.

In the back-pressure device 30 having such a structure, the support body 50 can be lifted and lowered in a range from the highest position shown in FIG. 1 to the lowest position shown in FIG. 5.

More specifically, as shown in FIG. 1, when the support body 50 is located at the highest position, the upper surface of the receiving base 66 is substantially located at the same position as the lower surface of the squeeze ring 24 in the vertical direction.

As shown in FIGS. 1 and 5, the lower die assembly 20 has a through hole 29 extending along the axial direction L and opening in the opposed portion 28a of the inner surface 28 in the accommodation space 25.

In the through hole 29, a pushing mechanism 81 is provided along the axial direction L to be movable back and forth. The pushing mechanism 81 pushes the laminated body 12 placed on the receiving base 66.

A conveyor belt 82 is provided on the side opposite to the pushing mechanism 81 in the accommodation space 25. The conveyor belt 82 conveys, toward the outside of the lower die assembly 20, a laminated iron core 12a pushed by the pushing mechanism 81 toward the opening 25a. The conveyor belt 82 is located above the servomotor 31, the reduction drive 32, the joint 33, and the bearing 40.

The pushing mechanism 81 and the conveyor belt 82 are provided in correspondence with the lowest position of the receiving base 66 (support body 50).

In the present embodiment, the pushing mechanism 81 and the conveyor belt 82 constitute a removal mechanism 80 located between the die 22 and the output shaft 31a of the servomotor 31 in the vertical direction. The removal mechanism 80 removes the laminated iron core 12a along the axial direction L, which is orthogonal to the vertical direction.

The operation of the device of the present embodiment will now be described.

In the manufacturing device 1 of the present embodiment, the laminated iron core 12a is manufactured in the following manner.

Figure 4A:
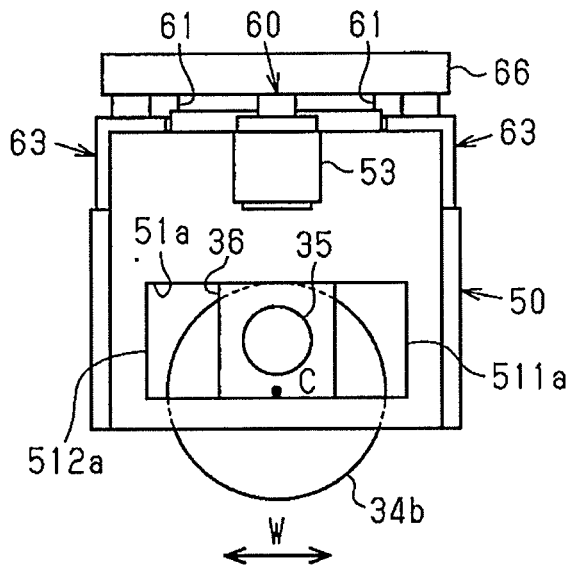
FIG. 4A is a front view mainly showing a support body of the back-pressure device of the embodiment, in which the support body is located at the highest position.

First, the support body 50 of the back-pressure device 30 is located at the highest position shown in FIG. 4A in an initial state.

In this state, when the punch 23 is lowered toward the workpiece 10 that has been conveyed to the upper side of the die 22, the iron core piece 11 is punched out of the workpiece 10 by the die 22 and the punch 23. The iron core piece 11 punched out by the punch 23 is pushed into the squeeze ring 24.

The iron core pieces 11 punched out of the workpiece 10 in this manner are sequentially pushed into the squeeze ring 24 and laminated. This forms the laminated body 12.

Each iron core piece 11 includes a known coupled portion (not shown) formed through doweling so as to protrude downward. Further, in the squeeze ring 24, the iron core pieces 11 are supported by the squeeze ring 24 over the entire circumferences from the side. Thus, the fitting relationship of the coupled portions causes the adjacent iron core pieces 11, which are pushed into the squeeze ring 24 by the punch 23, to be swaged and coupled to each other.

The laminated body 12 includes a dummy iron core piece 11 for every predetermined number of iron core pieces 11. The dummy iron core piece 11 has a hole (not shown) out of which the coupled portion is punched. Thus, a dummy iron core piece 11 is coupled to the iron core piece 11 located immediately above the dummy iron core piece 11 and is not coupled to the iron core piece 11 located immediately below the dummy iron core piece 11. Accordingly, the laminated body 12 is vertically separated at the dummy iron core piece 11.

Subsequently, when the number of the iron core pieces 11 constituting the laminated body 12 increases so that the lowest iron core piece 11 protrudes downward from the squeeze ring 24, the lower surface of the laminated body 12 receives back pressure from the receiving base 66 (back-pressure device 30). This swages the coupled portions of the adjacent iron core pieces 11 more strongly.

In addition, each gas spring 63 is compressed by an amount corresponding to the thickness of a part of the laminated body 12 protruding downward from the squeeze ring 24 (hereinafter referred to as protrusion thickness). When the servomotor 31 is driven by a controller (not shown) before the protrusion thickness exceeds the maximum value of the movable range of the rod 65 of the gas spring 63, the support body 50 is lowered to a position where the compression force acting on the gas spring 63 is released.

The support body 50 is lowered in the following manner.

As shown in FIG. 4A, when the support body 50 is located at the highest position, the eccentric rod 35 is located at the twelve o'clock position about the axis C. Further, the transmission member 36 is located at the middle part in the accommodation portion 51a in the width direction W.

Figure 4B:
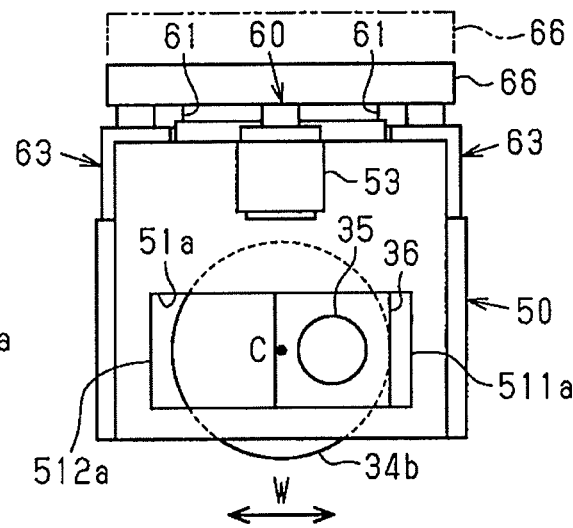
FIG. 4B is a front view mainly showing the support body of the back-pressure device of the embodiment, in which the support body is located at an intermediate position in the middle of movement from the highest position to the lowest position.

From this state, as shown in FIG. 4B, when the shaft 34 is rotated clockwise by the servomotor 31 and the eccentric rod 35 is rotated to the three o'clock position about the axis C, the transmission member 36 moves toward a first end 511a of the accommodation portion 51a in the width direction W and lowers the support body 50 to the intermediate position between the highest position and the lowest position in the vertical direction.

Figure 4C:
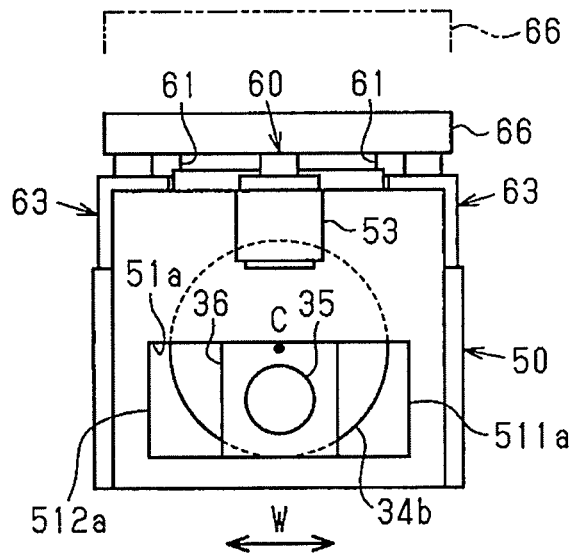
FIG. 4C is a front view mainly showing the support body of the back-pressure device of the embodiment, in which the support body is located at the lowest position.

From this state, as shown in FIG. 4C, when the shaft 34 is rotated clockwise by the servomotor 31 and the eccentric rod 35 is rotated to the six o'clock position about the axis C, the transmission member 36 moves toward a second end 512a of the accommodation portion 51a in the width direction W and returns to the middle part in the width direction W. This lowers the support body 50 to the lowest position.

When the number of the iron core pieces 11 constituting the laminated body 12 increases so that the iron core piece 11 immediately below the above-described dummy iron core piece 11 protrudes downward from the squeeze ring 24, the protruded part is separated as the laminated iron core 12a.

Then, as shown in FIG. 5, the support body 50 is lowered to the lowest position with the laminated iron core 12a placed on the receiving base 66, the laminated iron core 12a is pushed onto the conveyor belt 82 by the pushing mechanism 81 and conveyed to the outside of the lower die assembly 20.

After such a conveyance of the laminated iron core 12a, rotation of the shaft 34 produced by the servomotor 31 lifts the support body 50 to the highest position.

The support body 50 is lifted in the following manner.

Figure 4D:
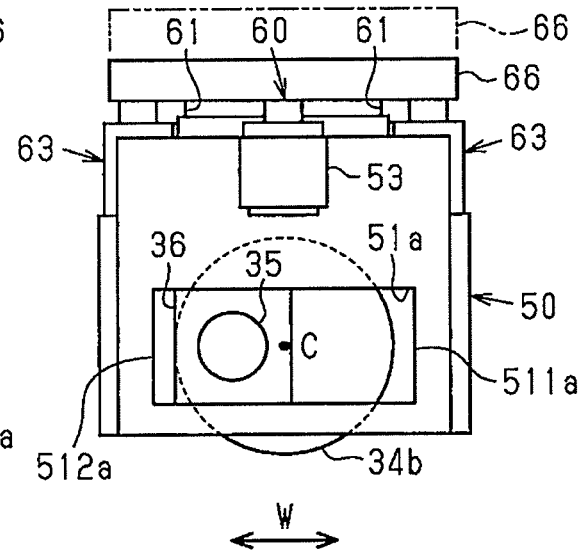
FIG. 4D is a front view mainly showing the support body of the back-pressure device of the embodiment, in which the support body is located at the intermediate position in the middle of movement from the lowest position to the highest position.

As shown in FIG. 4D, when the shaft 34 is rotated clockwise by the servomotor 31 and the eccentric rod 35 is rotated to the nine o'clock position about the axis C, the transmission member 36 moves toward the second end 512a of the accommodation portion 51a in the width direction W. This lifts the support body 50 to the intermediate position.

From this state, as shown in FIG. 4A, when the shaft 34 is rotated clockwise by the servomotor 31 and the eccentric rod 35 is rotated to the twelve o'clock position about the axis C, the transmission member 36 moves toward the first end 511a of the accommodation portion 51a in the width direction W and returns to the middle position in the width direction W. This lifts the support body 50 to the highest position.

Subsequently, the above-mentioned series of processes are repeatedly performed to manufacture the laminated iron cores 12a.

The manufacturing device for the laminated iron core according to the present embodiment has the advantages described below.

(1) The manufacturing device 1 includes the die 22 and the punch 23, which are configured to punch iron core pieces 11 out of the thin-plate workpiece 10, the squeeze ring 24 in which the iron core pieces 11 are laminated, and the back-pressure device 30, which is configured to apply back pressure to the laminated iron core pieces 11 from the side opposite to the punch 23 in the forward-backward direction of the punch 23. The punch 23 and the back-pressure device 30 are configured to manufacture the laminated iron core 12a by swaging the laminated iron core pieces 11. The back-pressure device 30 includes the support body 50, which is configured to move in the forward-backward direction (vertical direction) of the punch 23, and the gas springs 63, which are supported by the support body 50 and serve as the biasing members that bias the laminated iron core pieces 11 toward the punch 23. The back-pressure device 30 includes the servomotor 31 and the conversion mechanism 90. The servomotor 31 serves as the drive device including the output shaft 31a rotated about the axial direction L, which is an orthogonal direction orthogonal to the forward-backward direction. The conversion mechanism 90 is configured to convert rotary motion of the output shaft 31a into linear motion of the support body 50 in the forward-backward direction.

With such a structure, when an iron core piece 11 punched out by the punch 23 is clamped by the punch 23 and the gas springs 63 in the vertical direction, the iron core piece 11 is swaged to another iron core piece 11 that is already in a position between the punch 23 and the gas springs 63 so that the iron core pieces 11 are laminated. When the output shaft 31a of the servomotor 31 is rotated, the support body 50 is moved away from the punch 23 in the vertical direction by the conversion mechanism 90. Thus, the positions of the gas springs 63 in the vertical direction can be changed depending on the number of the laminated iron core pieces 11.

With the above-described structure, since the servomotor 31 serving as the drive device extends in the axial direction L, the back-pressure device 30 can be reduced in size in the vertical direction as compared to the conventional structure in which the drive device extends in the vertical direction. Additionally, the arrangement of the gas springs 63 in the support body 50 allows the size of the back-pressure device 30 in the vertical direction to be reduced as compared to the structure in which the back pressure is adjusted for the support body 50 using a hydraulic cylinder. Thus, the manufacturing device 1 is reduced in size.

(2) The conversion mechanism 90 includes the eccentric rod 35, which is coupled to the output shaft 31a of the servomotor 31 and is eccentric to the output shaft 31a, and the transmission member 36, which rotationally supports the eccentric rod 35 and is configured to transmit force from the eccentric rod 35 to the support body 50. The support body 50 is provided with the accommodation portion 51a, which accommodates the transmission member 36. The accommodation portion 51a is configured to restrict relative movement of the transmission member 36 in the forward-backward direction (vertical direction) and permit relative movement of the transmission member 36 in the width direction W orthogonal to the forward-backward direction (vertical direction) and the orthogonal direction (axial direction L).

With such a structure, rotation of the output shaft 31a of the servomotor 31 rotates the eccentric rod 35 along the predetermined circular orbit about the output shaft 31a. The rotation of the eccentric rod 35 causes the transmission member 36 to rotate. The transmission member 36 is accommodated in the accommodation portion 51a of the support body 50 in the manner as described above. Thus, the transmission member 36 moves the support body 50 in the vertical direction while moving in the vertical direction and the width direction W. Thus, since the conversion mechanism 90 includes the eccentric rod 35, the transmission member 36, and the accommodation portion 51a, the structure of the conversion mechanism 90 is simplified.

(3) The removal mechanism 80, which is configured to remove the laminated iron core 12a along the removal direction (axial direction L in the above-described embodiment) orthogonal to the forward-backward direction, is provided between the output shaft 31a of the servomotor 31 and the die 22 in the vertical direction.

With such a structure, the removal mechanism 80 removes the laminated iron core 12a along the axial direction L and is thus reduced in size in the vertical direction. This further reduces the size of the manufacturing device 1.

(4) The back-pressure device 30 is fixed to the bottom surface 26 of the accommodation space 25 in the lower die assembly 20.

With such a structure, since the back-pressure device 30 is fixed to the lower die assembly 20, there is no need for a process of positioning the lower die assembly 20 and the back-pressure device 30, which is required for a structure in which the lower die assembly 20 and the back-pressure device 30 are independently provided.

Modifications

It should be apparent to those skilled in the art that the present invention may be embodied in many other specific forms without departing from the spirit or scope of the invention. Particularly, it should be understood that the present invention may be embodied in the following forms.

The pushing mechanism 81 may push the laminated iron core 12a along the width direction W. That is, the pushing mechanism 81 may be provided so that the width direction W corresponds to the removal direction.

Instead of the pushing mechanism 81, a mechanism for pulling out the laminated iron core 12a may be adopted.

Instead of the gas springs 63, other elastic members such as coil springs or other biasing members may be adopted.

The shape of the transmission member 36 does not have to be cuboid and may be, for example, oval and tubular.

In the present embodiment, the support body 50 is moved in the vertical direction by rotating the servomotor 31 in a single direction. Instead, the support body 50 may be moved in the vertical direction by switching the rotation of the servomotor 31 between forward rotation and backward rotation. Additionally, in this case, the position of the eccentric rod 35 when the support body 50 is located at the highest position is not limited to the twelve o'clock position about the axis C. Instead, the highest position may be changed to, for example, the one o'clock position.

Therefore, the present examples and embodiments are to be considered as illustrative and not restrictive and the invention is not to be limited to the details given herein, but may be modified within the scope and equivalence of the appended claims.

The invention claimed is:

1. A manufacturing device for a laminated iron core, the manufacturing device comprising:
   a die and a punch configured to punch iron core pieces out of a thin-plate workpiece;
   a squeeze ring in which the iron core pieces are laminated; and
   a back-pressure device configured to apply back pressure to the laminated iron core pieces from a side opposite to the punch in a forward-backward direction of the punch, wherein
   the laminated iron core pieces are swaged using the punch and the back-pressure device, thereby manufacturing the laminated iron core, and
   the back-pressure device comprises:
      a drive device comprising an output shaft rotated about an orthogonal direction that is orthogonal to the forward-backward direction;
      a base configured to move in the forward-backward direction of the punch, the base including an opening extending through the base along the orthogonal direction and extending along a width direction which is orthogonal to the orthogonal direction and the forward-backward direction;
      a spring supported by the base and configured to bias the laminated iron core pieces toward the punch;
      a reduction drive coupled to the output shaft of the drive device;
      a joint coupled to an output shaft of the reduction drive;
      a shaft coupled to the joint, wherein a rotational axis of the output shaft of the drive device, a rotational axis of the output shaft of the reduction drive, a rotational axis of the joint, and a rotational axis of the shaft are coaxially located on a same axis;
      an eccentric rod coupled to the shaft, the eccentric rod being eccentric to the axis and being rotatable along a circular orbit about the axis in response to the rotary motion of the output shaft of the drive device; and
      a transmission that rotationally supports the eccentric rod and is configured to transmit force from the eccentric rod to the base, the transmission being accommodated in the opening of the base, a height of the transmission in the forward-backward direction being slightly lower than a height of the opening in the forward-backward direction to restrict relative movement of the transmission in the opening in the forward-backward direction and a width of the transmission in the width direction is smaller than a width of the opening in the width direction, such that the transmission pushes the base to move in the forward-backward direction in response to the rotation of the eccentric rod about the axis, and is moved in the opening in the width direction in response to the rotation of the eccentric rod about the axis.

2. The manufacturing device according to claim 1, wherein
   the spring is a gas spring.

3. The manufacturing device according to claim 1, further comprising
   a laminated iron core remover arranged between the punch and the output shaft of the drive device in the forward-backward direction, the laminated iron core remover configured to remove the laminated iron core along a removal direction that is orthogonal to the forward-backward direction.

4. A manufacturing device for a laminated iron core, the manufacturing device comprising:
   a die and a punch configured to punch iron core pieces out of a thin-plate workpiece;
   a squeeze ring in which the iron core pieces are laminated; and
   a back-pressure device configured to apply back pressure to the laminated iron core pieces from a side opposite to the punch in a forward-backward direction of the punch, wherein
   the laminated iron core pieces are swaged using the punch and the back-pressure device, thereby manufacturing the laminated iron core, and
   the back-pressure device comprises:
      a drive device comprising an output shaft rotated about an orthogonal direction that is orthogonal to the forward-backward direction;
      a base configured to move in the forward-backward direction of the punch, the base including an opening extending through the base along the orthogonal direction and extending along a width direction which is orthogonal to the orthogonal direction and the forward-backward direction;
      a spring supported by the base and configured to bias the laminated iron core pieces toward the punch;
      a reduction drive coupled to the output shaft of the drive device;
      a joint coupled to an output shaft of the reduction drive;
      a shaft coupled to the joint, wherein a rotational axis of the output shaft of the drive device, a rotational axis of the output shaft of the reduction drive, a rotational axis of the joint, and a rotational axis of the shaft are coaxially located on a same axis; and
      a converter configured to convert rotary motion of the output shaft of the drive device into linear motion of the base in the forward-backward direction, wherein
   the converter comprises:
      an eccentric rod coupled to the shaft, the eccentric rod being eccentric to the axis and being rotatable along a circular orbit about the axis in response to the rotary motion of the output shaft of the drive device; and
      a transmission that rotationally supports the eccentric rod and is configured to transmit force from the eccentric rod to the base, the transmission being accommodated in the opening of the base, a height of the transmission in the forward-backward direction being slightly lower than a height of the opening in the forward-backward direction to restrict relative movement of the transmission in the opening in the forward-backward direction and a width of the transmission in the width direction is smaller than a width of the opening in the width direction, such that the transmission pushes the base to move in the forward-backward direction in response to the rotation of the eccentric rod about the axis, and is moved in the opening in the width direction in response to the rotation of the eccentric rod about the axis.

5. The manufacturing device according to claim 4, wherein
the spring is a gas spring.

6. The manufacturing device according to claim 4, further comprising:
a laminated iron core remover arranged between the punch and the output shaft of the drive device in the forward-backward direction, the laminated iron core remover configured to remove the laminated iron core along a removal direction that is orthogonal to the forward-backward direction.

7. The manufacturing device according to claim 1, wherein the transmission is cuboid and has an opening extending in the orthogonal direction and in which the eccentric rod is inserted.

8. The manufacturing device according to claim 4, wherein the transmission is cuboid and has an opening extending in the orthogonal direction and in which the eccentric rod is inserted.

9. The manufacturing device according to claim 1, wherein the back-pressure device further comprises:
a receiving base configured to receive the laminated iron core pieces, wherein the spring is fixed to the receiving base; and
a restriction protrusion projecting from the base toward the receiving base.

10. The manufacturing device according to claim 4, wherein the back-pressure device further comprises:
a receiving base configured to receive the laminated iron core pieces, wherein the spring is fixed to the receiving base; and
a restriction protrusion projecting from the base toward the receiving base.

11. The manufacturing device according to claim 9, wherein
the spring includes two springs spaced apart in the width direction,
the restriction protrusion is provided between the two springs, and
when the receiving base moves toward the base against biasing force of the springs in the forward-backward direction, the receiving base abuts the restriction protrusion so that the movement of the receiving base in the forward-backward direction is restricted.

12. The manufacturing device according to claim 10, wherein
the spring includes two springs spaced apart in the width direction,
the restriction protrusion is provided between the two springs, and
when the receiving base moves toward the base against biasing force of the springs in the forward-backward direction, the receiving base abuts the restriction protrusion so that the movement of the receiving base in the forward-backward direction is restricted.

* * * * *